US009255984B1

(12) United States Patent  
Williams

(10) Patent No.: US 9,255,984 B1  
(45) Date of Patent: Feb. 9, 2016

(54) USING SENSOR MEASUREMENTS OF NEARBY DEVICES FOR ESTIMATING CONFIDENCE OF LOCATION DETERMINATION

(71) Applicant: Google Inc., Mountain View, CA (US)

(72) Inventor: Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/611,673

(22) Filed: Feb. 2, 2015

Related U.S. Application Data

(60) Provisional application No. 62/045,149, filed on Sep. 3, 2014.

(51) Int. Cl.
*G01S 5/10* (2006.01)
*G01S 5/02* (2010.01)
(Continued)

(52) U.S. Cl.
CPC ............... *G01S 5/10* (2013.01); *G01S 5/0252* (2013.01); *G01C 21/3602* (2013.01); *G01S 5/0278* (2013.01); *H04W 4/02* (2013.01)

(58) Field of Classification Search
CPC ......... G07C 5/008; G01S 15/42; G01S 13/04; G01S 15/04; G01S 15/06; G01S 17/026; G01S 13/50; G01S 5/06; G01S 5/0263; G01S 5/28; G01S 15/931; G01S 17/08; G01S 2015/932; G01S 7/4972; G08B 13/2462; G08B 13/248; G08B 21/04; H04W 4/028; H04W 4/025; H04W 4/043; G01N 2291/105; H04B 17/27; G06K 2209/19; G06K 9/3208; G06K 9/6218; G06K 9/00201; G06K 9/00671; G06K 9/00691; G06K 9/00805; G06K 9/00812; G06K 9/6202; G06K 9/00791; G06T 7/0071; G06T 7/2006; G06T 7/2013; H04N 5/145; H04N 7/0127; H04N 7/014; H04N 7/181; G01C 21/3602; G02B 21/008
See application file for complete search history.

(56) References Cited

U.S. PATENT DOCUMENTS

| | | | | |
|---|---|---|---|---|
| 2012/0046045 | A1* | 2/2012 | Gupta | G01S 5/0252 455/456.1 |
| 2013/0265428 | A1* | 10/2013 | Yoon | G06K 9/00812 348/148 |
| 2015/0142248 | A1* | 5/2015 | Han | G01C 21/3602 701/23 |

OTHER PUBLICATIONS

J.D. D Foley—Random Sample Consensus: A paradigm for model fitting with application to image analysis and automated cartography.*

(Continued)

*Primary Examiner* — Nizar Sivji
(74) *Attorney, Agent, or Firm* — McDonnell Boehnen Hulbert & Berghoff LLP

(57) ABSTRACT

Methods and systems are disclosed for evaluating the reliability of sensor measurements of environmental properties used for deriving the location of a mobile device. A mobile device can receive measurements of environmental properties made sensors of one or more other mobile devices concurrently with real-time measurements of the environmental properties made by sensors of the mobile device. The mobile device can determine that each of the other mobile devices is within a locality threshold of the mobile device. The mobile device can determine that a difference between at least one of the real-time measurements and a metric of the received measurements corresponds to a statistical likelihood that the at least one of the real-time measurements is unreliable. Any of the real-time measurements that are determined to be unreliable can be excluded from a location determination of the mobile device derived from the real-time measurements of the environmental properties.

27 Claims, 4 Drawing Sheets

(51) Int. Cl.
*H04W 4/02* (2009.01)
*G01C 21/36* (2006.01)

(56) References Cited

OTHER PUBLICATIONS

"Towards Robust Graphical Models for GNSS-Based Localization in Urban ," Niko Sunderhauf and Peter Protzel, Proc. of IEEE Intl. Multi-Conf. on Systems, Signals, and Devices (SSD), 2012.

"RANSAC," from Wikipedia, at http://en.wikipedia.org/wiki/RANSAC.

"Outlier-Detection-Based Indoor Localization System for Wireless Sensor Networks," Yu-Chi Chen and Jyh-Ching Juang, Hindawi Publishing Corporation, International Journal of Navigation and Observation vol. 2012, Article ID 961785.

"Consistent Cooperative Localization," Alexander Bahr, Matthew R. Walter, and John J. Leonard, 2009. ICRA '09. IEEE International Conference on. 2009. 3415-3422. © 2009 Institute of Electrical and Electronics Engineers.

\* cited by examiner

USING SENSOR MEASUREMENTS OF NEARBY DEVICES FOR ESTIMATING CONFIDENCE OF LOCATION DETERMINATION

CROSS-REFERENCE TO RELATED APPLICATIONS

This application claims priority under 35 U.S.C. §119(e) to U.S. Provisional Patent Application Ser. No. 62/045,149, filed on Sep. 3, 2014, which is incorporated herein in its entirety by reference.

BACKGROUND

Unless otherwise indicated herein, the materials described in this section are not prior art to the claims in this application and are not admitted to be prior art by inclusion in this section.

It may be of interest for a computing device to be able to determine its location. For example, a computing device may be a mobile device. The location of a mobile device may change from time to time, and there may be services available to the mobile device that are based, at least in part, on a location of the mobile device.

A mobile device (and more generally a computing device) can include different types of positioning systems for determining a geographic location of the mobile device. For example, a mobile device may include a global positioning system (GPS) configured to determine the position of a mobile device using timing signals sent by GPS satellites above the Earth. As another example, a mobile device may be configured to make use of the presence of one or more particular cellular radio towers, wireless access points, and/or Bluetooth transmitters, to estimate the position of the mobile device based on triangulation and/or fingerprinting. Further, a mobile device may be configured to use data collected by sensors (e.g., accelerometers, gyroscopes, magnetometers, etc.) of the mobile device to facilitate location determination. Still further, a mobile device may be configured to merge data from various sources, such as GPS, Wi-Fi, cellular radio towers, and sensors of the mobile device to determine a location estimate.

SUMMARY

In one aspect, a method involves: receiving, by a mobile device, measurements of one or more environmental properties made by one or more sensors of each of one or more other mobile devices, the received measurements having been made concurrently with real-time measurements of at least one of the one or more environmental properties made by one or more sensors of the mobile device; determining, by the mobile device, that each of the one or more other mobile devices is within a locality threshold of the mobile device; determining, by the mobile device, that a difference between at least one of the real-time measurements and a metric of the received measurements corresponds to a statistical likelihood of the at least one of the real-time measurements being unreliable; and based on the determined unreliability, the mobile device excluding the at least one of the real-time measurements from a location determination of the mobile device derived from the real-time measurements of the at least one of the one or more environmental properties.

In another aspect, mobile device may include: one or more processors; memory accessible by the one or more processors; and machine-readable instructions stored in the memory, that upon execution by the one or more processors cause the mobile device to carry out operations including: receiving measurements of one or more environmental properties made by one or more sensors of each of one or more other mobile devices, wherein the received measurements have been made concurrently with real-time measurements of at least one of the one or more environmental properties made by one or more sensors of the mobile device, determining that each of the one or more other mobile devices is within a locality threshold of the mobile device, determining that a difference between at least one of the real-time measurements and a metric of the received measurements corresponds to a statistical likelihood of the at least one of the real-time measurements being unreliable, and based on the determined unreliability, excluding the at least one of the real-time measurements from a location determination of the mobile device derived from the real-time measurements of the at least one of the one or more environmental properties.

In yet another aspect, a non-transitory computer-readable medium having instructions stored thereon that, upon execution by one or more processors of a mobile device, cause the mobile device to carry out operations including: receiving measurements of one or more environmental properties made by one or more sensors of each of one or more other mobile devices, wherein the received measurements have been made concurrently with real-time measurements of at least one of the one or more environmental properties made by one or more sensors of the mobile device; determining that each of the one or more other mobile devices is within a locality threshold of the mobile device; determining that a difference between at least one of the real-time measurements and a metric of the received measurements corresponds to a statistical likelihood of the at least one of the real-time measurements being unreliable; and based on the determined unreliability, excluding the at least one of the real-time measurements from a location determination of the mobile device derived from the real-time measurements of the at least one of the one or more environmental properties.

These as well as other aspects, advantages, and alternatives, will become apparent to those of ordinary skill in the art by reading the following detailed description, with reference where appropriate to the accompanying drawings.

DETAILED DESCRIPTION

Figure 1:
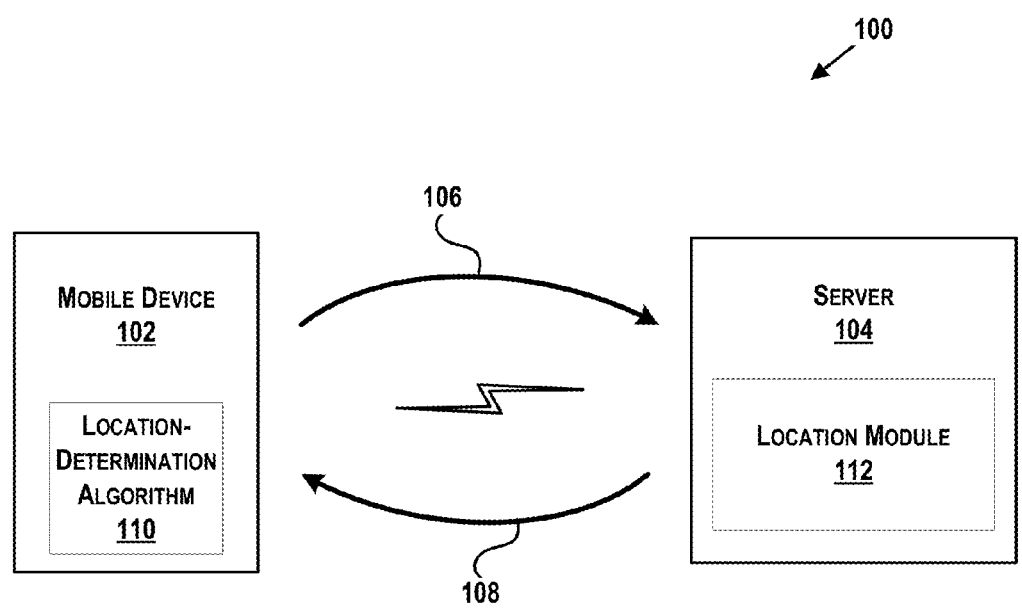
FIG. 1 illustrates an example communication system in which an example method of determining confidence of location estimation of a mobile device may be implemented.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

A mobile device may include one or more sensors for measuring environmental properties or detecting environmental signals, which may then be analyzed to determine a location of the mobile device. Non-limiting examples of sensors include GPS receivers, Wi-Fi receivers, compasses, accelerometers, magnetometers, gyroscopes, and barometers. In an example embodiment, one or more techniques can be used to merge or "fuse" different types of environmental properties and/or signals measured or detected by a mobile device in order to derive a location of the mobile device. For example, GPS signals may provide one form of approximate location, while a magnetometer measurement in conjunction with an accelerometer measurement may provide motion and orientation information, which may then be used to help refine the approximate location. Techniques that determine location from measurements of different types of environmental properties or signals are sometimes referred to as "fused location" techniques, and may be implemented by one or another type of "fused location provider" ("FLP") configured to carry out one or another form of "fused location algorithm." Fused location techniques are just one example of location derivation that makes use of measurements or detections of different types of environmental properties or environmental signals by a device whose location is so determined.

Fused location providers can be implemented in hardware, referred to as a hardware FLP (or HW FLP), and/or in software, referred to as a software FLP (or SW FLP). In an example embodiment, a mobile device can be configured to run a HW FLP, a SW FLP, or both. In example embodiments, a FLP can be implemented on a mobile device, a server device, or both.

In some instances, one or more sensor measurements of one or more environmental properties may be unreliable for purposes of determining location (e.g., as provided by a FLP). For example, a metal object near the mobile device might deflect a compass or otherwise contaminate a magnetometer measurement of the Earth's magnetic field. Another example could involve multi-path reflection of a GPS signal. In still another example, proximity to an air conditioning vent could cause a barometer could to detect as sudden change air pressure. Other forms of contamination or corruption of environmental measurements and/or signals are possible as well. If an unreliable environmental sensor measurement is used in a FLP algorithm (or other type of location determination based on environmental sensor measurements), the derived location determination might be rendered inaccurate.

In particular, if a mobile device and/or a FLP implemented on the mobile device is unaware of contamination or corruption of one or more environmental measurements used by the FLP, the mobile device might not be aware that a derived location is or will be inaccurate. For example, the mobile device might be powered on at a location that causes one or more sensor measurements to be corrupted. In such a circumstance, the mobile device might not be aware of that one or more sensor measurements are unreliable for purposes of FLP location determination. Accordingly, it would be desirable for a mobile device to be able to be alerted or otherwise become aware when one or more environmental properties measured by one or more sensors of the mobile device are unreliable.

In accordance with example embodiments, a mobile device can communicate with one or more other mobile devices within a locality threshold, and thereby receive one or more sensor measurements from the other mobile devices. Then, by applying an analytical test to both the received sensor measurements and real-time measurements from one or more of its own sensors, the mobile device can identify potentially unreliable measurements from among its own sensors. The mobile device can thus exclude unreliable sensor measurements from its derivation of location based on environmental sensor measurements, and thereby reduce or eliminate inaccuracies that might otherwise effect the determination of its location.

In an example embodiment, the mobile device can use a statistical analysis technique for identifying "outliers" among a set of real-time data measurements. In such a technique, an "outlier" refers to a measurement that differs from others in the set in a way that makes it statistically unlikely to be a valid sample of the quantity (or quantities) measured by the data set. For sensor measurements of environmental properties or signals, an outlier can be an indication of a contaminated, corrupted, or otherwise invalid measurement, such as the examples of deflected magnetic field or multipath GPS signals mentioned above. Thus, identification of outliers can provide a basis for rejection of data that might otherwise be applied in a FLP location determination. As a statistical technique, one or another threshold test can be applied to define a limit (or limits) beyond which a measurement may be considered an outlier.

More particularly, the statistical analysis technique for identifying outliers can be applied by the mobile device to an ensemble of its own real-time sensor measurements and concurrent sensor measurements received from one or more nearby mobile devices. In this way, the mobile device can identify which, if any, of its own real-time measurements may be outliers and should therefore be excluded (or considered for exclusion) from a location determination that is derived from (or based on) the mobile device's sensor measurements. The sensor measurements received from the other, nearby mobile devices can provide a sort of concurrent baseline for the various environmental properties and/or signals in the vicinity of the mobile device. Identified outliers among the mobile device's measurements can indicate a local disturbance to one or more of these same environmental properties and/or signals. Outlier identification can therefore provide a technique for alerting the mobile device of measurement(s) from its own sensors that should (or might need to be) rejected in circumstances in which the mobile device might not otherwise know.

One example of a known statistical analysis technique for identifying outliers is an algorithm known as "RANdom SAmple Consensus," or "RANSAC." RANSAC employs a technique that iteratively fits a parameterized model to different subsets of a set of data to refine the model parameters, and then to identify remaining data that are in good statistical agreement with the refined model. Through repeated iterations, the model may be improved at the same time that outliers are identified. Other known techniques for outlier identification and data rejection are available as well.

By applying the statistical analysis technique to an ensemble of its own real-time sensor measurements and concurrent sensor measurements received from one or more nearby mobile devices, a mobile device can make a real-time determination of outliers. In accordance with example embodiments, this approach can thus enhance the accuracy of real-time location determination made by the mobile device for the circumstances that call for a real-time determination but also lead to a lack of awareness on the part of the mobile device of the reliability of its sensor measurements. An example, as mentioned above, is when a mobile device is powered on without a prior knowledge of its location.

By including concurrent sensor measurements received from one or more nearby mobile devices in the ensemble of data measurements used for identifying outliers, the technique can account for local effects that might consistently bias measurements from one or more of the mobile device's sensors. In further accordance with example embodiments, this approach can thus compensate for biases that might otherwise be introduced into the statistical analysis technique for identifying outliers. More specifically, because the other nearby mobile devices will generally not be at the exact location of the mobile device, their sensor measurements will generally not be subject to the same local effects that may be corrupting the sensor measurements of the mobile device.

In accordance with example embodiments, a mobile device can receive concurrent sensor measurements from other mobile devices by way of a direct wireless connection with the other mobile devices, by way of an intermediate device, or both. For example, the mobile device can communicate directly with one or more of the other nearby mobile devices via a Bluetooth link or an infrared (IR) link. As another example, the mobile device and one or more of the other nearby mobile devices could be communicatively connected with a network server or other computing device. The network server could act as an intermediary for communications between the mobile device and one or more of the other nearby mobile devices, including those communications carrying sensor measurements.

In accordance with example embodiments, a mobile device can apply various criteria or tests to determine that another mobile device is sufficiently nearby by to use sensor measurements from the other mobile device in the outlier detection technique. More particularly, the mobile device can determine if the other mobile device is within a locality threshold. If so, the mobile device can use one or more sensor measurements received from the other mobile device in the outlier detection technique. Otherwise, the mobile device can decide not to include one or more sensor measurements received from the other mobile in the outlier detection technique. The locality threshold can take various forms, depending, for example on the type of sensor data or the environmental property measured. By way of example, a locality threshold can be a distance based on a signal strength received from the other mobile device, or possibly just based on the ability to receive sensor measurements from the other mobile device. As another example, the ability of both the mobile device and the other mobile device to communicate with a common wireless access point could indicate that the locality threshold is met. Other examples of locality threshold are discussed below.

2. Illustrative Systems and Devices

Referring now to the figures, FIG. 1 illustrates an example communication system 100 in which example methods can be implemented. By way of example, the communication system 100 includes a mobile device 102 and a server 104, which are configured for communicating with one another via one or more wired and/or wireless interfaces. The mobile device 102 and the server may communicate within a network. Alternatively, the mobile device 102 and the server 104 may each reside within a respective network. Although not necessarily shown in FIG. 1, the mobile device 100 can also be configured for communicating with other mobile devices, either directly, via a direct communication link (e.g., Bluetooth), or by way of an intermediate device (e.g., a common wireless access point, a network switch, a network server, etc.).

The mobile device 102 can be any type of computing device including a laptop computer, a mobile telephone, tablet computer, wearable computer, among others, arranged to carry out various methods and computed device functions and operations described herein. The mobile device 102 can also be configured to transmit data 106 to or receive data 108 from the server 104 in accordance with various methods and computed device functions and operations described herein. The mobile device may include a location-determination algorithm 110 that can be configured to determine a location estimate for the mobile device. For instance, the location-determination algorithm may be a HW FLP that is designed to fuse data from various sources like GPS, Wi-Fi, cellular radio towers, sensors, Bluetooth, etc. to provide a location estimate. The mobile device 102 may also include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out various methods and computed device functions and operations described herein. Further, the server 104 may be configured to send data 108 to or receive data 106 from the mobile device 102. The server 104 may include a location module 112 that can be configured to process the data 106 received from the mobile device 102.

The data 106 received by the server 104 from the mobile device 102 may take various forms. For example, the mobile device 102 may collect a log of sensor data that includes sensor values output by given sensors of a plurality of sensors of the mobile device over a time period. Further, the data 106 may include at least one location estimate. Additionally or alternatively, the data 106 can include real-time sensor measurements.

The data 108 sent to the mobile device 102 from the server 104 may take various forms. For example, the server 104 may send to the mobile device 102 instructions that cause the mobile device 102 to collect a log of sensor data. Additionally or alternatively, the data 108 can sensor measurements received by the server 104 from one or more other mobile devices.

Figure 2:
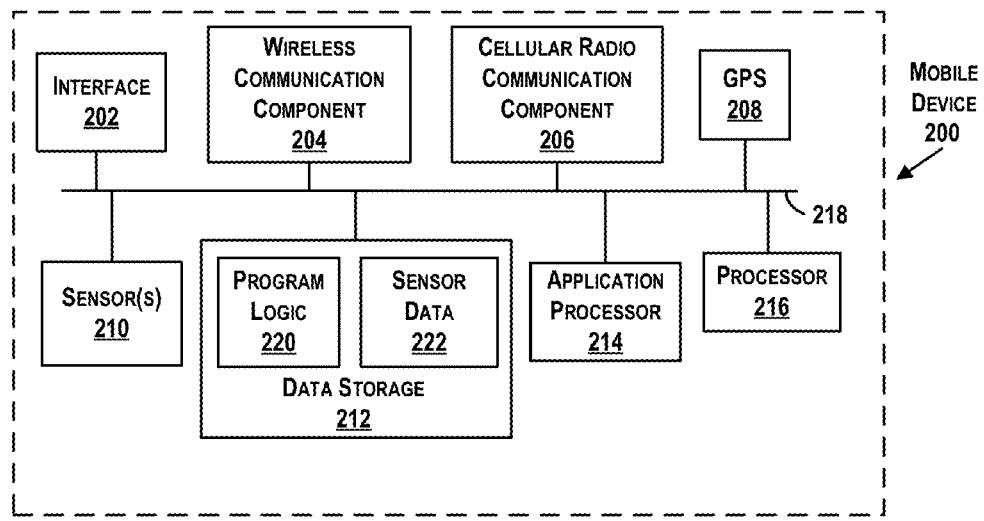
FIG. 2 illustrates a schematic drawing of an example mobile device, in accordance with example embodiments.

FIG. 2 illustrates a schematic drawing of an example mobile device 200. In some examples, some components illustrated in FIG. 2 may be distributed across multiple computing devices. However, for the sake of example, the components are shown and described as part of one example mobile device 200. The mobile device 200 may be or include a mobile phone, robotic device, wearable computer, tablet computer, laptop computer, email/messaging device, or similar device that may be configured to perform the functions described herein.

In some implementations, the mobile device 200 may include a device platform (not necessarily shown), which may be configured as a multi-layered Linux platform. The device platform may include different applications and an application framework, as well as various kernels, libraries, and runtime entities. In other examples, other formats may operate the mobile device 200 as well.

The mobile device 200 may include an interface 202, a wireless communication component 204, a cellular radio communication component 206, a GPS receiver 208, sensor(s) 210, data storage 212, application processor 214, and an additional processor 216. Components illustrated in FIG. 2 may be linked together by a communication link 218. The mobile device may also include hardware to enable communication within the mobile device 200 and between the mobile device 200 and another computing device (not shown), such as a server entity. The hardware may include transmitters, receivers, and antennas, for example.

The interface 202 may be configured to allow the mobile device 200 to communicate with another computing device (not shown), such as a server or another mobile device. Thus, the interface 202 may be configured to receive input data from one or more computing devices, and may also be configured to send output data to the one or more computing devices. In some examples, the interface 202 may also maintain and manage records of data received and sent by the mobile device 200. In other examples, records of data may be maintained and managed by other components of the mobile device 200. The interface 202 may also include a user-interface, such as a keyboard, microphone, touchscreen, etc., to receive inputs as well.

The wireless communication component 204 may be a communication interface that is configured to facilitate wireless data communication for the mobile device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The sensor 210 may include one or more sensors, or may represent one or more sensors included within the mobile device 200. Non-limiting examples of sensors include an accelerometer, gyroscope, magnetometer, barometer, pedometer, light sensors, microphone, camera, or other location and/or context-aware sensors. Note that the wireless communication component 204, cellular radio communication component 206, and GPS receiver 208 may each also be considered sensors for purposes of the example methods and computing device functions and operations described herein.

The application processor 214 and/or the processor 216 may be configured to determine one or more geographical location estimates of the mobile device using one or more location-determination components, such as the wireless communication component 204, the cellular radio communication component 206, the GPS receiver 208, or the sensor 210. For instance, the application processor 214 and/or the processor 216 may use a location-determination algorithm to determine a location of the mobile device 200 based on a presence and/or location of one or more known wireless access points within a wireless range of the mobile device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the mobile device 200 may be determined.

In another instance, the application processor 214 and/or the processor 216 may use a location-determination algorithm to determine a location of the mobile device based on nearby cellular radio towers (e.g., base stations). For example, the cellular radio communication component 206 may be configured to at least identify a cell from which the mobile device 200 is receiving, or last received, signals from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the mobile device 200.

In still another example, the application processor 214 and/or the processor 216 may use a location-determination algorithm to determine a location of the mobile device 200 based on signals sent by GPS satellites orbiting the Earth. For example, the GPS receiver 208 may be configured to estimate a location of the mobile device by precisely timing signals sent by the GPS satellites.

In some examples, the application processor 214 and/or the processor 216 may use a location-determination algorithm that merges location estimates determined by multiple location-determination components, such as a merging of the wireless communication component 204, the cellular radio communication component 206, the GPS receiver 208, and one or more of the sensors 210. Further, the application processor 214 and/or the processor 216 may determine a location of the mobile device by communicating with another computing device, e.g., a server. For instance, the application processor 214 and/or the processor 216 may provide data to a server for processing, and receive from the server a location estimate. Alternatively, the application processor 214 and/or the processor 216 may provide data to a server for processing, and receive from the server processed data that facilitates location determination. Thus, the location-determination may occur in conjunction with a server in a network.

The data storage 212 may store program logic 220 that can be accessed and executed by the processor 214 and/or processor 216 in order to carry out various operations and functions described herein. The data storage 212 may also store collected sensor data 222 that may include data collected and/or determined by any of the wireless communication component 204, the cellular radio communication component 206, the GPS receiver 208, and any of the sensors 210.

In accordance with example embodiments, the processor 216 may be configured to determine location estimates independently of the main application processor. For instance, the processor 216 may execute instructions to provide a FLP. By way of example, the FLP may be a service that runs independently of any application program and is designed to fuse data from various sources such as GPS satellites, wireless access points, cellular radio towers, or one or more of the sensors 210, etc., to provide a location estimate. In one example, the FLP may be a HW FLP that is executed by hardware of the mobile device (e.g., the processor 216) without waking up the application processor 214.

The communication link 218 is illustrated as a wired connection; however, wireless connections may also be used. For example, the communication link 218 may be a wired serial bus such as a universal serial bus or a parallel bus, or a wireless connection using, e.g., short-range wireless radio technology, communications protocols described in IEEE 802.11 (including any IEEE 802.11 revisions), or cellular technology, among other possibilities.

Figure 3:
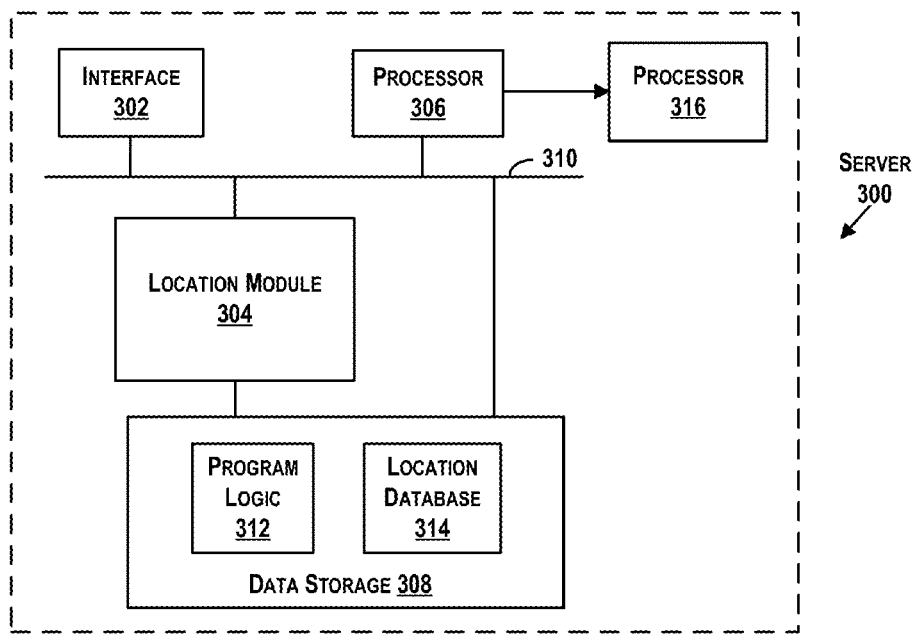
FIG. 3 illustrates a schematic drawing of an example computing device, in accordance with example embodiments.

FIG. 3 illustrates a schematic drawing of another example computing device, which, by way of example, takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile device or other type of computing device. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

In accordance with example embodiments, the communication interface 302 may be configured to receive sensor date from one or more mobile devices, and to send such sensor date to another, different mobile device.

The location module 304 may be configured to receive data from a mobile device and determine an estimated trajectory of the mobile device. For instance, the location module 304 may determine one or more locations of the mobile device using a log of sensor data received from the mobile device.

The data storage 308 may store program logic 312 that can be accessed and executed by the processor 306 in order to carry out various operations and functions described herein. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a mobile device.

The server is illustrated with a second processor 316 that may be an application specific processor for input/output functionality. In other examples, functions of the processor 306 and the processor 316 may be combined into one component.

3. Example Operation and Methods

A mobile device, such as the mobile device 200 shown in FIG. 2 for example, can be configured for determining its location by analyzing or processing environmental properties measured by one or more sensors and/or environmental signals detected by one or more sensors. For example, GPS satellite signals received by a GPS receiver of a mobile device may be processed to determine location. Similarly, RF signals from one or more cellular radio towers may be analyzed to determine a mobile device's location. Some location determination techniques may also make use of measurements of environmental properties such as geomagnetic field or gravity in order to determine orientation and/or motion of a mobile device. Orientation and/or motion may be then used to enhance location estimates obtained directly from measurements of other types of environmental properties, or to augment measurements of other types of environmental properties that do not by themselves lead to location determination. As described above, one type of location determination technique that makes use of sensor measurements from different types of sensors that measure or detect different types of environmental properties or signals is a fused location technique. A fused location technique can be implemented by a FLP.

Location determination using a FLP can be advantageous in circumstance in which of any one type environmental property is not sufficient to render an accurate determination of location. For example, GPS satellite signals may be partially blocked within a building such that an accurate location cannot be derived for the signals that are received. By augmenting the GPS signals that can be detected with one or more other types of sensor measurements, a FLP can still derive an accurate location for the mobile device. It can also be the case that fusing data from measurements of different types of environmental properties to determine location can be achieved at lower cost to battery power than a device or subsystem dedicated to location determination from one type of sensor.

Whether a location determination is made using a single type of sensor measurements or different types of sensor measurements, the reliability and/or validity of the sensor measurements used can impact the accuracy of the derived location. As discussed above, situations can arise in which a mobile device, or a location determination facility of the mobile device, may not know the reliability and/or validity of one or more of its sensor measurements. In particular, the mobile device might be unaware that one or more of its sensors is providing at least some unreliable data. For example, upon entering a building, a mobile device might be subject to multipath reflections of GPS satellite signals, or the mobile device might come to be situated nearby an object containing ferromagnetic material that distorts the local geomagnetic field. Similar situations can arise when a mobile device powers on, and thus may have no a priori awareness of its physical surroundings.

While techniques exist for a single device to identify outliers among data from only its own sensors, in the situations such as the examples just described, one or more of a mobile device's sensors may be reporting systematically corrupted or contaminated measurements. Existing outlier detection techniques may not be effective for analyzing data that are all systematically biased in some way. For example, proximity of the mobile device to a field-distorting ferromagnetic material could call all (or nearly all) of the mobile device's magnetometer measurements to contain the same bias. In this case, conventional outlier-detection techniques might not find any outliers among the measurements, even though the measurements might not represent accurate measurements of the geomagnetic field in the vicinity of the mobile device.

In accordance with example embodiments, a mobile device can receive sensor measurements from other, nearby mobile devices, and use the received measurements to determine what degree of confidence should be associated with the mobile device's location determination. More particularly, the mobile device can use the received sensor measurements to identify outliers from among its own sensor measurements.

Identified outliers can then either be excluded from location determination techniques that employ sensor data, and/or be used to apply a statistical confidence to a location determination that did not necessarily exclude the potential outliers.

Figure 4:
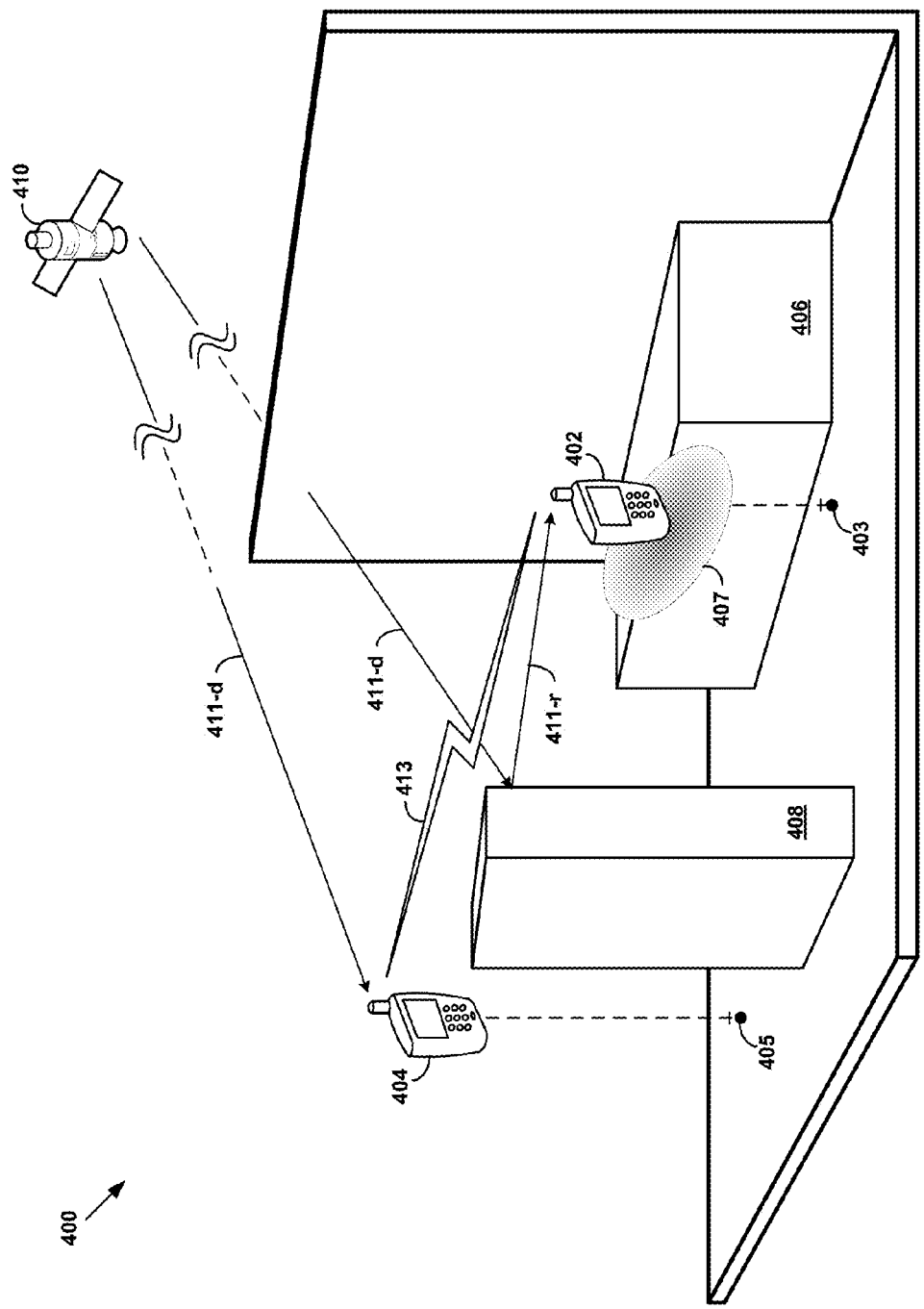
FIG. 4 is conceptual illustration of example operation of an example embodiment of determining confidence of location estimation of a mobile device.

FIG. 4 is conceptual illustration of example operation of an example embodiment of identifying outliers and/or determining confidence of location estimation of a mobile device. By way of example, FIG. 4 depicts a locale 400, represented by a vertical wall (unlabeled) and a horizontal floor (unlabeled). It will be appreciated that the locale 400 may include additional architectural structures as well, and the single wall and floor are meant provide at least a partial contextual reference. Also by way of example, the locale 400 includes a representative desk 406 and a representative bookcase 408. Other physical elements could be present as well.

A mobile device 402 is shown within the locale 400, its location referenced to a floor position 403. For purposes of illustration, a mobile device 404 is also shown within the locale 400, its location referenced to a floor position 405. Also for purposes of illustration, the location of the mobile device 402 happens to be near the desk 406. As an illustration of distortion of environmental properties, the desk 406 may be imagined to be made of, or contain, a ferromagnetic material (e.g., iron). As a possible consequence, the geomagnetic field in the immediate neighborhood of the mobile device 402 may be distorted by the ferromagnetic material of the desk 406. This field distortion 407 is represented conceptually as a shaded oval partly surrounding the mobile device 402. It will be appreciated that the field distortion 407 serves as a sort of visual cue for the presence and location of the field-distorting effect of the desk 406, and is not intended to represent an actual visually perceivable physical property.

To illustrate the possible occurrence of multi-path reflections, a GPS satellite 410 is represented in the upper right of FIG. 4. The GPS satellite is depicted as broadcasting GPS signals that propagate toward the mobile devices 402 and 404 on a propagation path 411-d (among other possible propagation directions). As shown, the GPS signals are received by the mobile device 404 directly along the propagation path 411-d. However, the same GPS signals are evidently subject to reflection by the bookcase 408, and are then received by the mobile device 402 along the multi-path reflection 411-r.

Both of the effects illustrated by way of example—the field distortion 407 and the multi-path reflection 411-r—can cause the mobile device 402 to derive an inaccurate location from a location-determination technique that uses sensor measurements or detections of these environmental properties or signals. However, in accordance with example embodiments, the mobile device 402 can become aware of the potentially unreliable nature of its sensor measurements by receiving sensor measurements from the mobile device 404, and analyzing the received sensor measurements with those of its own. The ability to determine the reliability of its sensor measurements in this way enables the mobile device 402 to take one or more corrective or compensatory actions when deriving its location based on sensor measurements.

More particularly, the mobile device 402 can receive sensor measurements from the mobile device 404 by way of a direct communicative link between the two. This is illustrated in FIG. 4, where the link 413 represents wireless transmission of sensor measurements from the mobile device 404 to the mobile device 402. Upon receiving the sensor measurements, the mobile device 402 can apply an outlier identification technique to both its own sensor measurements and those received from the mobile device 404. In this way the mobile device 402 can determine, for example, that its geomagnetic field measurements are likely corrupted in some way. Similarly, the mobile device 402 can determine that the GPS signals 411-r that it is receiving are likely subject to multi-path reflection. In either case, the mobile device 402 can take one or another type of corrective action in the face of the unreliable measurements from its own sensors. For example, the unreliable sensor data can be excluded from FLP analysis.

Continuing with the example operation illustrated in FIG. 4, the mobile device 402 could determine a direction and magnitude of the geomagnetic field as measured by its own magnetometer. By determining a reference direction for gravity, for example using measurements from its accelerometer, the mobile device 402 could then refer is measurement of the geomagnetic field to the direction of gravity. Comparing this measured geomagnetic field direction and magnitude with magnetometer measurements from received from the mobile device 404, the mobile device 402 can then recognize that its own geomagnetic field measurements are likely corrupted of contaminated in some way. Similarly, the mobile device 402 might use timing measurements from the GPS signals as measured by the mobile device 404 to determine that its own GPS signals (e.g., those received on the multi-path reflection 411-r) have likely been received on a path with one or more reflections, and should therefore be ignored or corrected in some manner.

In accordance with example embodiments, the mobile device 402 can use a statistical analysis technique to determine which, if any, of its own sensor measurements may be unreliable. More specifically, the mobile device 402 may apply a statistical analysis technique to an ensemble of its own real-time sensor measurements and concurrent sensor measurements received from one or more other mobile devices, such as the mobile device 404. An example of such a statistical analysis technique is RANSAC, a brief description of which can be found at the online webpage http://en.wikipedia.org/wiki/RANSAC. Briefly, RANSAC iteratively fits a parameterized model to successive subsets of a set of data to obtain a best fit to the subset. The remainder of the data set is then tested against the best fit model in an attempt to identify further data points that appear to be well described by the model, and to readjust the model with the original subset plus the further identified data. By carrying out the process iteratively, the set of data well described by the model will tend to grow, while those data that are not well described by the model tend to classified as outliers.

For identification of potentially unreliable sensor measurements from one or more of its own sensors, the mobile device 402 can apply RANSAC to the ensemble of its own sensor measurements and those received from one or more other mobile devices, taking as an initial subset some or all of the measurements received from the mobile device 404 (and possibly one or more other mobile devices as well). It will be appreciated that other techniques for outlier detection can be used as well. In this way, the mobile device 402 starts by fitting a model to the received measurements, and then tests its own sensor measurements against the fitted model. Other iteration strategies can be used as well.

Although not necessarily illustrated in FIG. 4, communication between the mobile devices 402 and 404 could also (or instead) be through an intermediary device, such as the server 300 depicted in FIG. 3. For example, the server 300 could be a network server. Additionally or alternatively, communication could be by way of a common wireless access point. For communication by way of an intermediary, the sensor data sent to the mobile device 402 could be anonymized by the intermediary device such that the mobile device 402 could still make use of the measurement of the associated environmental properties, but would not necessarily obtain any information that could enable it to determine the identity of the mobile device 404 (or, for example, of its user). In this way, the privacy of the mobile device 404 (and its user) can be maintained, while the utility of the sensor measurements of the mobile device 404 can still be derived.

The example operation illustrated in FIG. 4 can be extended to additional mobile devices, such as the mobile device 404, which make their sensor measurement data available to the mobile device 402. The example operation can also be extended to include one or more additional mobile devices, which, like the mobile device 402, may be operating under circumstances in which they might be obtaining unreliable measurements of one or more types of environmental properties and/or signals. In accordance with example embodiments, the sensor measurements from the mobile device 404, and any possible additional nearby mobile devices with sensor data to share, can correspond to a measurements of environmental properties made concurrently with real-time sensor measurements of the mobile device 402 (and/or possibly other mobile devices that might be making one or more unreliable sensor measurements).

In accordance with example embodiments, the mobile device 402 can use various criteria to determine that the mobile device 404 is sufficiently nearby to warrant using the sensor measurements received from the mobile device 404 to help evaluate the reliability of its own sensor measurements. More particularly, the mobile device 402 can apply a locality threshold test to determine if the mobile device 404 (or possibly one or more other mobile devices) is close enough. In one example, the locality threshold can be a specific distance threshold within which the mobile device 404 is deemed close enough. The mobile device 402 can determine whether another mobile device (such as the mobile device 404) is within the distance threshold using one or more techniques. For example, the mobile device 402 can use the strength or a signal received from the other mobile device to estimate a distance that the other mobile device is within the distance threshold. As a variation of signal strength criteria, the mobile device 402 can base its determination that the locality threshold is met simply on the ability detect and receive sensor measurements sent by another mobile device. The mobile device 402 can also more directly measure a distance to another mobile device by transmitting a timing message to the other mobile device, and then receiving a reply. This can be used to determine a round-trip propagation delay, from which a distance can be derived.

In another example, if the mobile device 402 receives sensor measurements from the mobile device 404 by way of an intermediary device, such as a wireless access point or a network server, the mobile device 402 can assume that the locality threshold is met. In this case, the intermediary device may recognize that the mobile devices 402 and 404 are in close enough proximity to one another to expect them to have the same (or nearly the same) sensor measurements for one or more environmental properties. This may be considered a sort of implicit determination by the mobile device 402 that the locality threshold test is satisfied.

In further accordance with example embodiments, the locality threshold can depend on the environmental property that is being measured. For example, the region over which the geomagnetic field can be expected to remain largely constant is generally larger than that over which the timing in GPS satellite signals can be used to distinguish multi-path reflections. Accordingly, the locality threshold for sharing sensor measurements of geomagnetic field can be larger than that for sharing timing data from GPS signals.

The examples above for defining and using a locality threshold are not intended to be limiting. Furthermore, a mobile device (such as the mobile device 402) can employ any one or more of the various techniques and criteria for determining that a locality threshold test is satisfied in any given instance.

Figure 5:
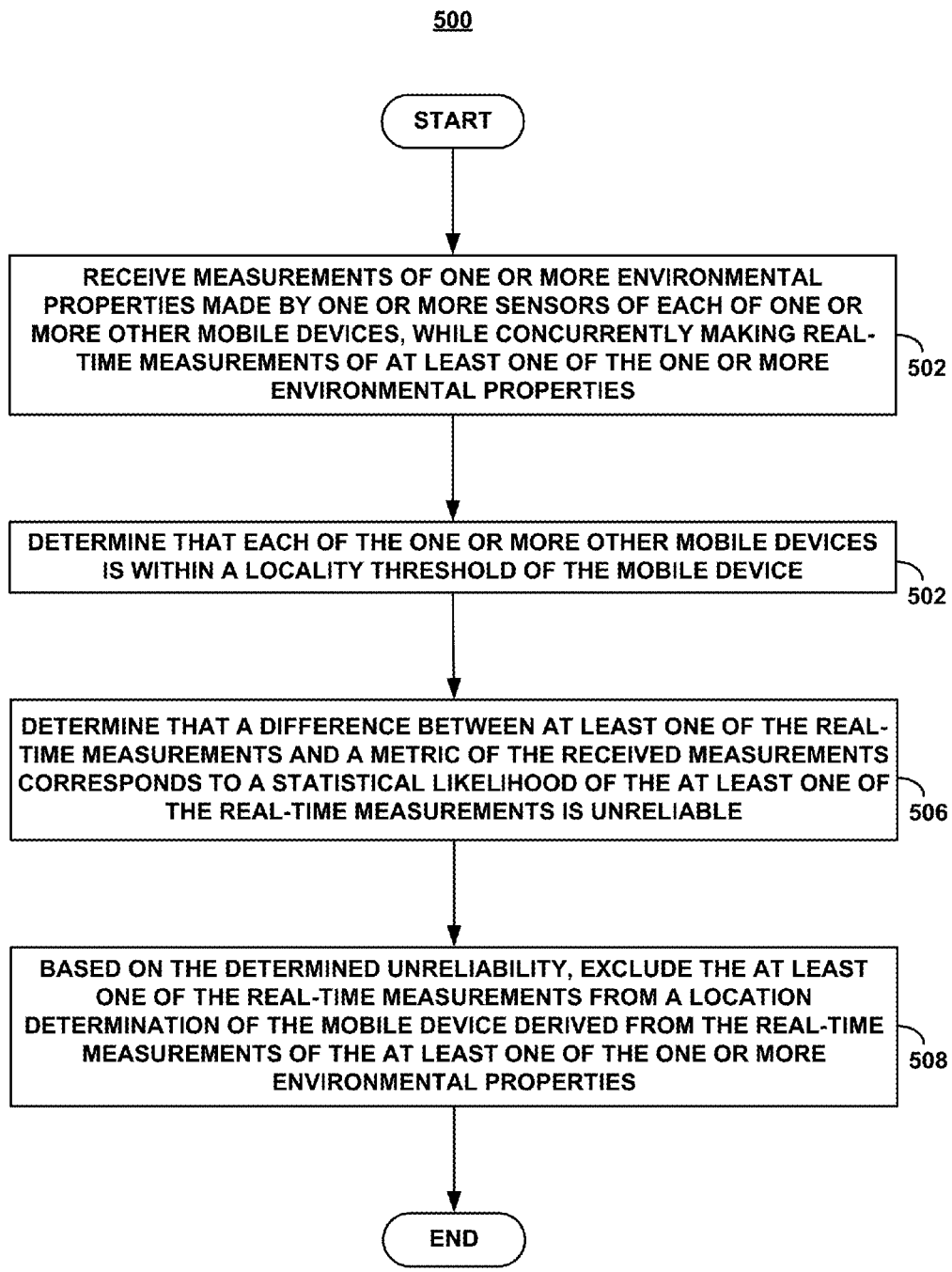
FIG. 5 is a flow chart illustrating an example method of determining confidence of location estimation of a mobile device, in accordance with example embodiments.

FIG. 5 is a flow chart illustrating an example method 500 of identifying outliers and/or determining confidence of location estimation of a mobile device. In accordance with example embodiments, the example method 500 can be a computer-implemented method configured for being carried out by one or more processors of a mobile device, such as the mobile devices 102, 200, or 402, for example.

The flow chart of the example method 500 is represented as a series of blocks, each of which may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, each block in FIG. 5 can represent circuitry (including one or more integrated circuits) that is wired (or preconfigured) to perform the specific logical functions in the process.

At step 502, a mobile device receives measurements of one or more environmental properties made by one or more sensors of each of one or more other mobile devices. In accordance with example embodiments, the received measurements are concurrent with real-time measurements of at least one of the one or more environmental properties made by one or more sensors of the mobile device. Thus, the real-time measurements made by the mobile device's sensor(s) are concurrent with those received from the other mobile devices.

At step 504, the mobile device determines that each of the one or more other mobile devices is within a locality threshold of the mobile device. In accordance with example embodiments, the mobile device can determine that each of the one or more other mobile devices is within a threshold distance of the mobile device. Additionally or alternatively, the mobile device can determine that it and each of the other mobile devices are within a region over which spatial variability of any of the one or more environmental properties can be expected to below a threshold level at any given time. That is, a region within which different sensors measuring the same environmental property can be expected to obtain substantially the same measurement.

At step 506, the mobile device determines that a difference between at least one of the real-time measurements and a metric of the received measurements corresponds to a statistical likelihood that the at least one of the real-time measurements is unreliable.

Finally, at step 508 the mobile device, based on the determined unreliability, excludes the at least one of the real-time measurements from a location determination of the mobile device derived from the real-time measurements of the at least one of the one or more environmental properties.

In accordance with example embodiments, the mobile device can receive the measurements directly from at least one of the one or more other devices by way of a wireless communication link between the mobile device and the at least one of the one or more other devices. For example, the mobile device and one or more of the other mobile devices can communicate via Bluetooth or an IR link. In further accordance with example embodiments, the mobile device can receive the measurements from at least one of the one or more other devices by way of an intermediate network device communicatively linked to both the mobile device and the at least one of the one or more other devices. By way of example, the intermediate device could be a wireless access point, a cellular tower, a network switch, or a network server.

In accordance with example embodiments, the sensors of each of the other mobile devices and the sensors of the mobile device can include any one or more of an accelerometer, a gyroscope, a magnetometer, a global positioning system (GPS) receiver, a Wi-Fi sensor, a Bluetooth sensor, or a barometer. In further accordance with example embodiments, the one or more environmental properties measured by the sensor(s) of the mobile device and of the other mobile devices can include any one or more of acceleration, geomagnetic field, GPS satellite signals, Wi-Fi signal strength, Bluetooth signal strength, and barometric pressure.

In accordance with example embodiments, determining that the at least one of the real-time measurements is unreliable can entail formulating a metric of the received measurements, such as an average or fitting a model to the received measurements. Then, an analytical test can be applied to the real-time measurements of the mobile device to evaluate the statistical significance of observed differences between the real-time measurements and the determined metric. In particular, determining that the one or more of the real-time measurements is unreliable can entail applying a statistical test for identifying statistical outliers to an aggregate or an ensemble of the real-time measurements and the received measurements.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a mobile device, measurements of one or more environmental properties made by one or more sensors of each of one or more other mobile devices, the received measurements having been made concurrently with real-time measurements of at least one of the one or more environmental properties made by one or more sensors of the mobile device;
   determining, by the mobile device, that each of the one or more other mobile devices is within a locality threshold of the mobile device;
   determining, by the mobile device, that a difference between at least one of the real-time measurements and a metric of the received measurements corresponds to a statistical likelihood of the at least one of the real-time measurements being unreliable by analyzing the difference between the at least one of the real-time measurements and the determined metric; and
   based on the determined unreliability, the mobile device excluding the at least one of the real-time measurements from a location determination of the mobile device derived from the real-time measurements of the at least one of the one or more environmental properties.

2. The method of claim 1, wherein receiving, by the mobile device, the measurements of the one or more environmental properties made by the one or more sensors of each of the one or more other mobile devices comprises receiving the measurements directly from at least one of the one or more other devices by way of a wireless communication link between the mobile device and the at least one of the one or more other devices.

3. The method of claim 1, wherein receiving, by the mobile device, the measurements of the one or more environmental properties made by the one or more sensors of each of the one or more other mobile devices comprises receiving the measurements from at least one of the one or more other devices by way of an intermediate network device communicatively linked to both the mobile device and the at least one of the one or more other devices.

4. The method of claim 1, wherein the one or more sensors of each of the one or more other mobile devices and the one or more sensors of the mobile device are selected from a group consisting of an accelerometer, a gyroscope, a magnetometer, a global positioning system (GPS) receiver, a Wi-Fi sensor, a Bluetooth sensor, and a barometer.

5. The method of claim 1, wherein the one or more environmental properties are selected from a group consisting of acceleration, geomagnetic field, GPS satellite signals, Wi-Fi signal strength, Bluetooth signal strength, and barometric pressure.

6. The method of claim 1, wherein determining, by the mobile device, that each of the one or more other mobile devices is within a locality threshold of the mobile device comprises determining that the mobile device and each of the one or more other mobile devices are within a spatial region over which a spatial variability of any given one of the one or more environmental properties is analytically expected to be below a variability threshold at any given time.

7. The method of claim 1, wherein determining, by the mobile device, that each of the one or more other mobile devices is within a locality threshold of the mobile device comprises determining that each of the one or more other mobile devices is within a threshold distance of the mobile device.

8. The method of claim 1, wherein determining, by the mobile device, that the difference between the at least one of the real-time measurements and the metric of the received measurements corresponds to the statistical likelihood of the at least one of the real-time measurements being unreliable further comprises:

determining the metric of the received measurements.

9. The method of claim 1, wherein analyzing the difference between the at least one of the real-time measurements and the determined metric comprises applying a statistical test for identifying statistical outliers to an aggregate of the real-time measurements and the received measurements.

10. A mobile device comprising:
one or more processors;
memory accessible by the one or more processors; and
machine-readable instructions stored in the memory, that upon execution by the one or more processors cause the mobile device to carry out operations including:
receiving measurements of one or more environmental properties made by one or more sensors of each of one or more other mobile devices, wherein the received measurements have been made concurrently with real-time measurements of at least one of the one or more environmental properties made by one or more sensors of the mobile device,
determining that each of the one or more other mobile devices is within a locality threshold of the mobile device,
determining that a difference between at least one of the real-time measurements and a metric of the received measurements corresponds to a statistical likelihood of the at least one of the real-time measurements being unreliable analyzing the difference between the at least one of the real-time measurements and the determined metric, and
based on the determined unreliability, excluding the at least one of the real-time measurements from a location determination of the mobile device derived from the real-time measurements of the at least one of the one or more environmental properties.

11. The mobile device of claim 10, wherein receiving the measurements of the one or more environmental properties made by the one or more sensors of each of the one or more other mobile devices comprises receiving the measurements directly from at least one of the one or more other devices by way of a wireless communication link between the mobile device and the at least one of the one or more other devices.

12. The mobile device of claim 10, wherein receiving the measurements of the one or more environmental properties made by the one or more sensors of each of the one or more other mobile devices comprises receiving the measurements from at least one of the one or more other devices by way of an intermediate network device communicatively linked to both the mobile device and the at least one of the one or more other devices.

13. The mobile device of claim 10, wherein the one or more sensors of each of the one or more other mobile devices and the one or more sensors of the mobile device are selected from a group consisting of an accelerometer, a gyroscope, a magnetometer, a global positioning system (GPS) receiver, a Wi-Fi sensor, a Bluetooth sensor, and a barometer.

14. The mobile device of claim 10, wherein the one or more environmental properties are selected from a group consisting of acceleration, geomagnetic field, GPS satellite signals, Wi-Fi signal strength, Bluetooth signal strength, and barometric pressure.

15. The mobile device of claim 10, wherein determining that each of the one or more other mobile devices is within a locality threshold of the mobile device comprises determining that the mobile device and each of the one or more other mobile devices are within a spatial region over which a spatial variability of any given one of the one or more environmental properties is analytically expected to be below a variability threshold at any given time.

16. The mobile device of claim 10, wherein determining that each of the one or more other mobile devices is within a locality threshold of the mobile device comprises determining that each of the one or more other mobile devices is within a threshold distance of the mobile device.

17. The mobile device of claim 10, wherein determining that the difference between the at least one of the real-time measurements and the metric of the received measurements corresponds to the statistical likelihood of the at least one of the real-time measurements being unreliable further comprises:

determining the metric of the received measurements.

18. The mobile device of claim 10, wherein analyzing the difference between the at least one of the real-time measurements and the determined metric comprises applying a statistical test for identifying statistical outliers to an aggregate of the real-time measurements and the received measurements.

19. A non-transitory computer-readable medium having instructions stored thereon that, upon execution by one or more processors of a mobile device, cause the mobile device to carry out operations including:
receiving measurements of one or more environmental properties made by one or more sensors of each of one or more other mobile devices, wherein the received measurements have been made concurrently with real-time measurements of at least one of the one or more environmental properties made by one or more sensors of the mobile device;
determining that each of the one or more other mobile devices is within a locality threshold of the mobile device;
determining that a difference between at least one of the real-time measurements and a metric of the received measurements corresponds to a statistical likelihood of the at least one of the real-time measurements being unreliable analyzing the difference between the at least one of the real-time measurements and the determined metric; and
based on the determined unreliability, excluding the at least one of the real-time measurements from a location determination of the mobile device derived from the real-time measurements of the at least one of the one or more environmental properties.

20. The non-transitory computer-readable medium of claim 19, wherein receiving the measurements of the one or more environmental properties made by the one or more sensors of each of the one or more other mobile devices comprises receiving the measurements directly from at least one of the one or more other devices by way of a wireless communication link between the mobile device and the at least one of the one or more other devices.

21. The non-transitory computer-readable medium of claim 19 by the mobile device, the measurements of the one or more environmental properties made by the one or more sensors of each of the one or more other mobile devices comprises receiving the measurements from at least one of the one or more other devices by way of an intermediate network device communicatively linked to both the mobile device and the at least one of the one or more other devices.

22. The non-transitory computer-readable medium of claim 19, wherein the one or more sensors of each of the one or more other mobile devices and the one or more sensors of the mobile device are selected from a group consisting of an accelerometer, a gyroscope, a magnetometer, a global positioning system (GPS) receiver, a Wi-Fi sensor, a Bluetooth sensor, and a barometer.

23. The non-transitory computer-readable medium of claim 19, wherein the one or more environmental properties are selected from a group consisting of acceleration, geomagnetic field, GPS satellite signals, Wi-Fi signal strength, Bluetooth signal strength, and barometric pressure.

24. The non-transitory computer-readable medium of claim 19, wherein determining that each of the one or more other mobile devices is within a locality threshold of the mobile device comprises determining that the mobile device and each of the one or more other mobile devices are within a spatial region over which a spatial variability of any given one of the one or more environmental properties is analytically expected to be below a variability threshold at any given time.

25. The non-transitory computer-readable medium of claim 19, wherein determining that each of the one or more other mobile devices is within a locality threshold of the mobile device comprises determining that each of the one or more other mobile devices is within a threshold distance of the mobile device.

26. The non-transitory computer-readable medium of claim 19, wherein determining that the difference between the at least one of the real-time measurements and the metric of the received measurements corresponds to the statistical likelihood of the at least one of the real-time measurements being unreliable further comprises:

determining the metric of the received measurements.

27. The non-transitory computer-readable medium of claim 19, wherein analyzing the difference between the at least one of the real-time measurements and the determined metric comprises applying a statistical test for identifying statistical outliers to an aggregate of the real-time measurements and the received measurements.

* * * * *